United States Patent [19]

Itoh et al.

[11] Patent Number: 4,825,368

[45] Date of Patent: Apr. 25, 1989

[54] DEVICE FOR CONTROLLING VEHICLE FOUR WHEEL DRIVE FRONT/REAR COUPLING DEVICE BY LEARNING EFFECTIVE FRONT/REAR VEHICLE WHEELS RADIUS DISCREPANCY, AND METHOD OF OPERATION THEREOF

[75] Inventors: Hiroshi Itoh; Tokuyuki Takahashi, both of Toyota, Japan

[73] Assignee: Toyota Jidosha Kabushiki Kaisha, Aichi, Japan

[21] Appl. No.: 95,918

[22] Filed: Sep. 14, 1987

[30] Foreign Application Priority Data

Sep. 29, 1986 [JP] Japan ............................ 61-230544

[51] Int. Cl.⁴ .................. B60K 17/34; B60K 23/08; G05D 17/02
[52] U.S. Cl. ............................. 364/424.1; 74/866; 180/249
[58] Field of Search ... 364/424.1, 426, 426.01–426.05; 180/233, 251, 249; 74/866

[56] References Cited

U.S. PATENT DOCUMENTS

| | | | |
|---|---|---|---|
| 4,699,236 | 10/1987 | Morisawa et al. | 364/424.1 |
| 4,702,341 | 10/1987 | Taga et al. | 364/424.1 |
| 4,723,624 | 2/1988 | Kawasaki et al. | 180/233 |
| 4,729,450 | 3/1988 | Morisawa et al. | 180/249 |
| 4,751,856 | 6/1988 | Nakamura et al. | 74/866 |
| 4,754,835 | 7/1988 | Stelter et al. | 180/233 |
| 4,754,836 | 7/1988 | Harada et al. | 364/424.1 |
| 4,757,870 | 7/1988 | Torii et al. | 180/233 |
| 4,776,421 | 10/1988 | Kashihara | 180/249 |

Primary Examiner—Felix D. Gruber
Assistant Examiner—Christopher L. Makay
Attorney, Agent, or Firm—Oliff & Berridge

[57] ABSTRACT

In a four wheel drive vehicle having two front wheels and two rear wheels driven from an engine via a central differential gear and a front/rear coupling device for selectively locking up the differentiating operation of the central differential gear, a system for controlling the front/rear coupling device calculates an actual ratio between the effective rolling radius of the front wheels and the effective rolling radius of the rear wheels from the rotational speed of the front wheels and the rotational speed of the rear wheels detected by the rotational speed sensors when the vehicle is running along a substantially straight course at a speed within a predetermined relatively moderate speed range under an engine output power less than a predetermined relatively moderate rate with no braking while the front-/rear coupling device is released. Based upon the thus calculated ratio, the system calculates the difference between the peripheral speed of the front wheels and the peripheral speed of the rear wheels to detect a slippage in one of the front and rear wheels so as thereby to control the front/rear coupling device for locking up the differentiating operation of the central differential gear when more than a certain amount of slippage has occurred.

5 Claims, 6 Drawing Sheets

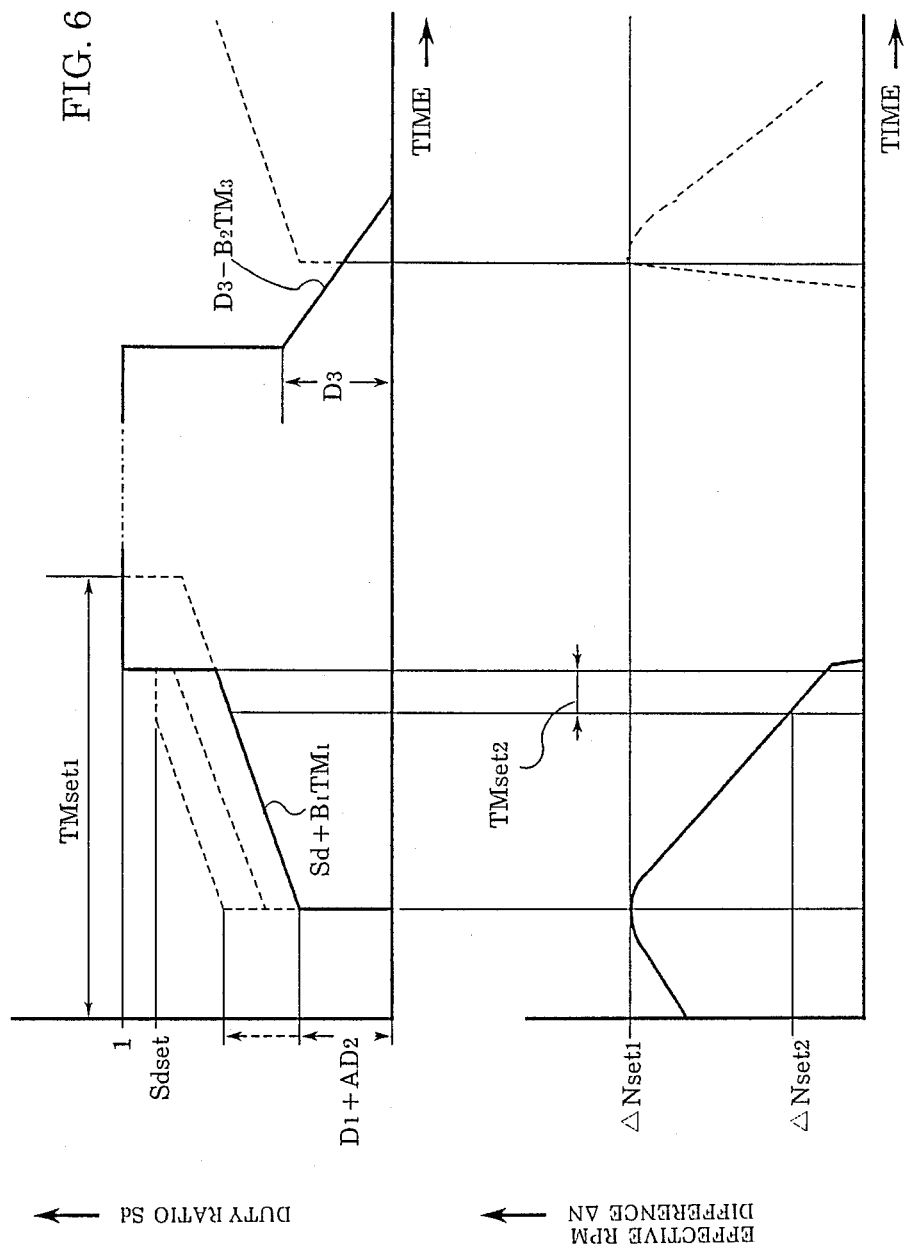

DEVICE FOR CONTROLLING VEHICLE FOUR WHEEL DRIVE FRONT/REAR COUPLING DEVICE BY LEARNING EFFECTIVE FRONT/REAR VEHICLE WHEELS RADIUS DISCREPANCY, AND METHOD OF OPERATION THEREOF

BACKGROUND OF THE INVENTION

The present invention relates to a vehicle four wheel drive front/rear coupling device control device and to a method of operation thereof, for a vehicle adapted for four wheel drive operation and incorporating a four wheel drive power transmission system, and more particularly relates to such a vehicle four wheel drive front/rear coupling device control device and method of operation thereof for a vehicle such as an automobile incorporating such a four wheel drive power transmission system, said front/rear coupling device control device and method providing control according to the effective discrepancy between the rotational speed of the rear vehicle wheels and the rotational speed of the front vehicle wheels, which is capable of performing a learning process for determining the discrepancy between the effective radius of the front vehicle wheels and the effective radius of the rear vehicle wheels.

The present invention has been described in Japanese Patent Application Ser. No. Showa 61-230544 (1986), which was filed by an applicant the same as the entity assigned or owed duty of assignment of the present patent application; and the present patent application hereby incorporates into itself by reference the text of said Japanese Patent Application and the claims and the drawings thereof; a copy is appended to the present application.

Nowadays a greatly increasing number of automotive vehicles are being constructed with four wheel drive transmission systems, because such four wheel drive operation, in which all four wheels of the vehicle are powered from its engine via its transmission, is very suitable for driving on poor or slippery road surfaces such as in mud or over bad ground, or upon roads covered with mud, snow, ice, or rain. In other words, four wheel drive operation provides a much higher degree of stability and drivability for the vehicle in conditions where the coefficient of friction between the wheels and the surface upon which the vehicle is being operated is relatively low. Also, four wheel drive operation is beneficial for aiding with hill climbing characteristics and high speed stability characteristics. Therefore, the so called full time four wheel drive type of transmission, which remains always engaged to four wheel drive without any episodes of two wheel driving, is becoming more and more popular.

In such a four wheel drive transmission system for an automotive vehicle, it is usual to provide a center differential device for distributing rotational power between the front wheels of the vehicle and the rear wheels of the vehicle, as well as the per se conventional rear differential device that provides differential action between the two rear vehicle wheels and the also per se conventional front differential device that provides differential action between the two front vehicle wheels. Such a central or front - rear differential device is provided in order to provide a differential action between said front vehicle wheels (considered as a pair) and said rear vehicle wheels (also considered as a pair) when the vehicle is turning around a curve, in order to eliminate the possiblity of the occurrence of the so called tight corner braking phenomenon created by the difference in the turning radiuses of the front wheels of the vehicle and the rear wheels thereof (and also for various other reasons). And such provision of such a central or front - rear differential device is effective for achieving this result. Further, it is per se conventional to provide, to such a center differential device, a torque distribution control clutch such as a central differential control clutch, which serves for regulating the distribution of the drive torque produced by the engine of the vehicle between the rear wheels of the vehicle (taken as a combination) and the front wheels of the vehicle (taken as a combination). Such a type of construction is disclosed, for example, in Japanese Patent Application Laying Open Publication Ser. No. 50-147027 (1975), in Japanese Patent Application Laying Open Publication Ser. No. 55-72420 (1980), and in Japanese Patent Application Laying Open Publication Ser. No. 57-15019 (1982). And such a torque distribution control clutch such as a central differential control clutch is typically controlled by a hydraulically operated servo device, so that the engagement pressure of said torque distribution control clutch, i.e. the maximum amount of torque that said torque distribution control clutch can transmit, which defines the amount of torque redistribution which said torque distribution control clutch can provide between the rear wheels of the vehicle (taken as a combination) and the front wheels of the vehicle (taken as a combination), is regulated by the magnitude of an actuating hydraulic fluid pressure. And such an actuating hydraulic fluid pressure is typically provided by a control system such as a hybrid electrical/hydraulic control system which may include a microcomputer.

Such a torque distribution control clutch or central differential action restriction means is typically provided for the following reason. If even one of the vehicle wheels slips, which may well occur especially when the vehicle is being operated upon a bad road surface such as when it is raining, it is snowing, or when the road is muddy, drive power will be lost, whereupon there is the problem that because of the differential effect of the center differential device the drive power of all wheels will be reduced, and the so called trailblazability of the vehicle will be severely deteriorated. In, therefore, a four wheel drive device having a center differential device, such a differential restriction device is typically provided, and is typically operated according to vehicle operational conditions. A four wheel drive device has already been proposed, constructed so that, when the difference between the rear wheel revolution rate and the front wheel revolution rate is at least a certain value, that is, when one vehicle tire is slipping with respect to the road surface, the differential control clutch is engaged, and the rear wheels and front wheels are directly coupled, whereas at other times the differential control clutch is released and the center differential device is allowed to carry out a differential effect; this is described in the above mentioned Japanese Patent Laying Open Publication No. Sho 55-72420 (1980). With the provision of such a differential control clutch, when said clutch is engaged then a condition of coupled or substantially coupled front/rear wheel operation of the vehicle is set up. This means that the driving characteristics of the vehicle are improved, so that, for example, when the vehicle is being operated upon a bad road surface such as when it is raining, it is snowing, or when the road is muddy, the vehicle is less likely to skid or get out of control, and further any single one of the vehicle wheels which would otherwise slip, for example if said when should fall into a wet hole or the like, is prevented from thereby suffering a loss of drive power.

On the other hand, there is a problem that arises with regard to the operation of such a front/rear coupling device for a four wheel drive vehicle like the above described type of clutch for such a central differential device. Namely, since the condition of at least one of the vehicle wheels being the slipping condition is determined according to whether or not the discrepancy (difference or ratio) between the rear wheel revolution rate and the front wheel revolution rate is, or is not, at least a certain value, thereby the setting of this value requires consideration of the fact that in actual operation of the vehicle, although the sizes (diameters) of the front vehicle wheels and of the rear vehicle wheels and of the tires mounted on them are nominally equal, nevertheless in practice, due to differences in weight distribution of the vehicle and due to differences in tire inflation pressures and tire wear amounts, the effective rolling radiuses of the front vehicle wheels and of the rear vehicle wheels may differ. This problem is exacerbated because this difference between the effective rolling radiuses of the front vehicle wheels and of the rear vehicle wheels may vary dynamically, not only over a period of months during the use of the vehicle but even during a single operational episode of said vehicle—as the tires fitted to the vehicle wheels become heated up through use, for example.

If this matter of the difference between the effective rolling radiuses of the front vehicle wheels and of the rear vehicle wheels is ignored completely during the operation of the front/rear coupling device like the above described type of clutch for such a central differential device, and merely said front/rear coupling device is engaged according to whether or not the discrepancy (difference or ratio) between the rear wheel revolution rate and the front wheel revolution rate is, or is not, at least a certain threshold value, then the following problems will arise. If this threshold value is a relatively low value, then there is a risk of engaging the front/rear coupling device during normal vehicle operation when none of the vehicle wheels is slipping, and this will partially or completely negate the initial purpose for providing the central differential device. Not only are abnormally high tire wear and fuel consumption likely to eventuate, but also abnormally high loads will be imposed upon various components in the vehicle power train, and this will likely deteriorate the reliability and the service life of said vehicle power train. On the other hand, if the threshold value is a relatively high value, then there is a risk of not engaging the front/rear coupling device during abnormal vehicle operation when one or more of the vehicle wheels is or are slipping, and this will partially or completely negate the initial purpose for providing the front/rear coupling device to the central differential device. This is likewise unsatisfactory; and, further, when the front/rear coupling device does finally engage due to increase of the discrepancy between the rear wheel revolution rate and the front wheel revolution rate above even this relatively high threshold value, then as a matter of course an abnormally high load will be imposed upon said front/rear coupling device, and this will likely deteriorate the reliability and the service life of said front/rear coupling device.

SUMMARY OF THE INVENTION

The inventors of the present invention have considered the problems detailed above in the aforementioned type of four wheel drive type vehicle incorporating such a four wheel drive power transmission system with such a front/rear coupling device, and have considered various possibilities for controlling such a front/rear coupling device.

Accordingly, it is the primary object of the present invention to provide an improved vehicle four wheel drive front/rear coupling device control device for a four wheel drive type vehicle, and a corresponding method for operating such a device, which avoid the problems detailed above.

It is a further object of the present invention to provide such a vehicle front wheel drive front/rear coupling device control device and method, which, while controlling said front/rear coupling device according to the difference between the rotational speed of the rear wheels of the vehicle and the rotational speed of the front wheels of the vehicle, effectively take dynamic account of the difference between the effective rolling radiuses of the front vehicle wheels and of the rear vehicle wheels.

It is a further object of the present invention to provide such a vehicle four wheel drive front/rear coupling device control device and method, which are capable of performing a learning process for determining a parameter or parameters representative of said difference between the effective rolling radiuses of the front vehicle wheels and of the rear vehicle wheels.

It is a further object of the present invention to provide such a vehicle four wheel drive front/rear coupling device control device and method, which do not run any risk of engaging the front/rear coupling device during normal vehicle operation when none of the vehicle wheels is slipping.

It is a further object of the present invention to provide such a vehicle four wheel drive front/rear coupling device control device and method, which do not risk unduly high tire wear.

It is a further object of the present invention to provide such a vehicle four wheel drive front/rear coupling device control device and method, which do not risk unduly high fuel consumption.

It is a further object of the present invention to provide such a vehicle four wheel drive front/rear coupling device control device and method, which do not risk imposing unduly high loads upon the components of the vehicle power train.

It is a further object of the present invention to provide such a vehicle four wheel drive front/rear coupling device control device and method, which do not risk deteriorating the reliability of the components of the vehicle power train.

It is a further object of the present invention to provide such a vehicle four wheel drive front/rear coupling device control device and method, which do not risk deteriorating the service life of the components of the vehicle power train.

It is a yet further object of the present invention to provide such a vehicle four wheel drive front/rear coupling device control device and method, which do not run any risk of not engaging the front/rear coupling device during abnormal vehicle operation when one or more of the vehicle wheels is or are slipping.

It is a yet further object of the present invention to provide such a vehicle four wheel drive front/rear coupling control device and method, which do not risk imposing unduly high loads upon said front/rear coupling device.

It is a yet further object of the present invention to provide such a vehicle four wheel drive front/rear coupling device control device and method, which do not risk deteriorating the reliability of said front/rear coupling device.

It is a yet further object of the present invention to provide such a vehicle four wheel drive front/rear coupling device control device and method, which do not risk deteriorating the service life of said front/rear coupling device.

According to the most general device aspect of the present invention, these and other objects are attained by, for a four wheel drive vehicle with two front wheels, two rear wheels, a four wheel drive device, and an engine, rotational power from said engine being provided via said four wheel drive device to the combination of the front wheels of said vehicle and also to the combination of the rear wheels of said vehicle, and further comprising a front/rear coupling device fitted to said four wheel drive device for selectively coupling together the rotation of said combination of said front vehicle wheels and the rotation of said combination of said rear vehicle wheels: a device for controlling said front/rear coupling device, comprising: (a) a means for detecting the rotational speed of said combination of the front wheels of said vehicle; (b) a means for detecting the rotational speed of said combination of the rear wheels of said vehicle; (c) a means for learning a correction value representing the discrepancy between the effective rolling radius of the front vehicle wheels and the effective rolling radius of the rear vehicle wheels from the thus detected rotational speed of said combination of the front wheels of said vehicle and the thus detected rotational speed of said combination of the rear wheels of said vehicle during a learning period of vehicle operation distinguished in that none of said vehicle wheels is substantially slipping with respect to the road surface; and: (d) a means for controlling said front/rear coupling device according to the discrepancy between the thus detected rotational speed of said combination of the front wheels of said vehicle and the thus detected rotational speed of said combination of the rear wheels of said vehicle, as corrected by said learned correction value; and, according to the most general method aspect of the present invention, these and other objects are attained by, for a four wheel drive device vehicle without two front wheels, two rear wheels, a four wheel drive device, and an engine, rotational power from said engine being provided via said four wheel drive device to the combination of the rear wheels of said vehicle, and further comprising a front/rear coupling device fitted to said four wheel drive device for selectively coupling together the rotation of said combination of said front vehicle wheels and the rotation of said combination of said rear vehicle wheels: a method for controlling said front/rear coupling device, wherein: (a) the rotational speed of said combination of the front wheels of said vehicle is detected; (b) the rotational speed of said combination of the rear wheels of said vehicle is detected; (c) a correction value representing the discrepancy between the effective rolling radius of the front vehicle wheels and the effective rolling radius of the rear vehicle wheels is learnt from the thus detected rotational speed of said combination of the front wheels of said vehicle and the thus detected rotational speed of said combination of the rear wheels of said vehicle during a learning period of vehicle operation distinguished in that none of said vehicle wheels is substantially slipping with respect to the road surface; and: (d) said front/rear coupling device is controlled according to the discrepancy between the thus detected rotational speed of said combination of the front wheels of said vehicle and the thus detected rotational speed of said combination of the rear wheels of said vehicle, as corrected by said learned correction value.

The logic for mensurating the discrepancy between the rear wheel rotational speed and the front wheel rotational speed may be either by calculating the rotation speed difference or by calculating the rotational speed ratio.

The device used for the application of the control device and the control method according to the present invention is typically capable of varying freely its maximum torque transmission capacity in response to an external control signal, and as this differential restriction device may be used a hydraulic servo type of wet multi plate clutch, an electromagnetic powder clutch, or the like.

According to such a device and such a method as described above, this vehicle four wheel drive front-/rear coupling device control device and method, while controlling the front/rear coupling device according to the difference between the rotational speed of the four wheels of the vehicle and the rotational speed of the front wheels of the vehicle, also by a learning process effectively take dynamic account of the difference between the effective rolling radiuses of the front vehicle wheels and of the rear vehicle wheels, by determining a parameter representative of said difference between the effective rolling radiuses of the front vehicle wheels and of the rear vehicle wheels, and by subsequently applying said parameter. Thereby, it is possible to set the threshold value for difference between the rotational speed of the rear wheels of the vehicle and the rotational speed of the front wheels of the vehicle, over which the front/rear coupling device is to be engaged, much smaller than was the case in the prior art as outlined above, without running any risk of engaging the front/rear coupling device during normal vehicle operation when none of the vehicle wheels is slipping. Accordingly, as explained above, risk of unduly high tire wear is not run, and further there is no risk of unduly high fuel consumption, or of the imposition of unduly high loads upon the components of the vehicle power train; whereby the reliability and the service life of the components of the vehicle power train are not deteriorated. Further, although the above identified threshold value can be set small, this does not run any risk of not engaging the front/rear coupling device during abnormal vehicle operation when one or more of the vehicle wheels is or are slipping, and accordingly does not risk imposing unduly high loads upon said front/rear coupling device, or of deteriorating the reliability or the service life of said front/rear coupling device.

According to various alternative particular specializations of the concept of the present invention; said learning period of vehicle operation may be further distinguished in that said front/rear coupling device is substantially fully disengaged; or in that the load on the vehicle engine is not more than a determinate value; or in that the steering angle of said vehicle is not more than a determinate value; or in that the braking system of said vehicle is not substantially applied; or in that the road speed of said vehicle is within a determinate road speed range.

BRIEF DESCRIPTION OF THE DRAWINGS

The present invention will now be described with respect to the preferred embodiments of the device and of the method thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference symbols, unless otherwise so specified, denote the same parts and chambers and flow chart steps and so on; and:

FIG. 6 is a pair of time charts, in both of which time is shown along the horizontal axis, and in one of which the duty ratio of a pulsed electrical signal which is being sent to the hydraulic fluid pressure supply device of FIG. 2 is shown along the vertical axis, while in the other thereof the effective difference between the rotational speed of the front vehicle wheels and the rotational speed of the rear vehicle wheels is shown along the vertical axis.

DESCRIPTION OF THE PREFERRED EMBODIMENTS

The present invention will now be described with reference to the preferred embodiments of the device and of the method thereof, and with reference to the figures.

OVERALL VEHICLE POWER TRAIN STRUCTURE

Figure 1:
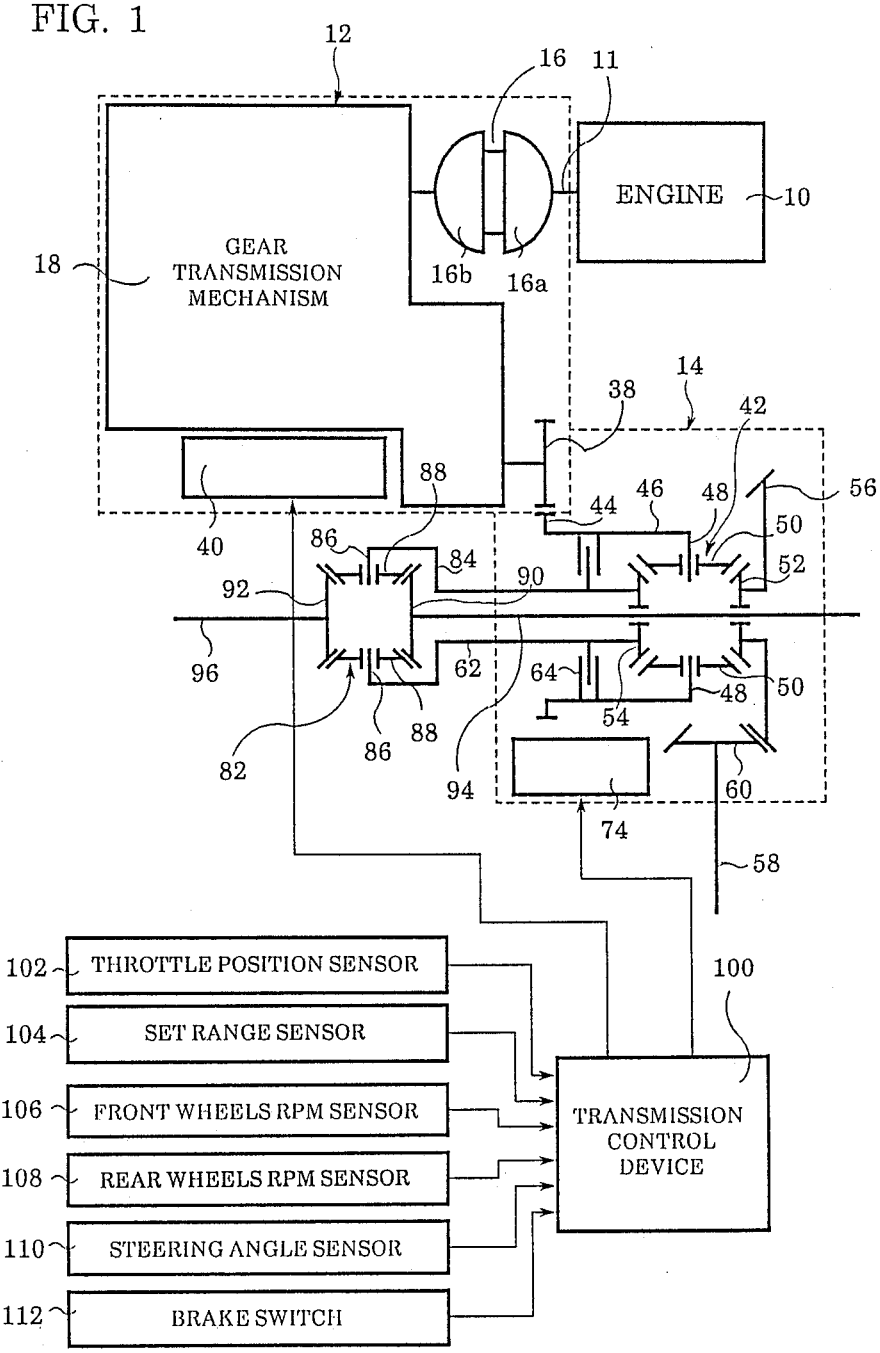
FIG. 1 is a schematic skeleton view of a power train for a four wheel drive vehicle which incorporates a four wheel drive front/rear coupling device (a front/rear center differential device), and includes a schematic block diagrammatical view of a control system for said front/rear coupling device which incorporates the preferred embodiment of the vehicle four wheel drive front/rear coupling device control device of the present invention, for practicing the preferred method embodiment.

FIG. 1 is a schematic longitudinal skeleton view of a power train of a vehicle, which incorporates the preferred embodiment of the control device of the present invention for controlling a vehicle four wheel drive front/rear coupling device, said control device performing the preferred method embodiment. In this figure, the reference numeral 10 denotes an internal combustion engine of the vehicle, which is mounted, in this exemplary case, transversely in the front engine room (not particularly shown) of said vehicle. And the reference numeral 12 denotes an automatic speed change device (automatic transmission) of a per se known type mounted to the rear of the engine 10, while 14 denotes a four wheel drive power transfer device which is always operating in so called full time four wheel drive mode, so as always to drive both the rear pair of wheels of the vehicle and also the front pair of wheels of the vehicle, albeit with a certain differential action which is provided by this four wheel drive power transfer device 14 being selectably either not provided at all, being provided to a limited degree, or being fully provided, as will be explained in detail hereinafter.

The automatic speed change device 12 incorporates a fluid torque converter 16 of a per se known construction, and the rotational power input member 16a of this fluid torque converter 16 is connected via an input shaft to and receives rotational power from a crank shaft of the internal combustion engine 10. And the automatic speed change device 12 further comprises a gear transmission mechanism 18, the rotational power input shaft of which is connected to and receives rotational power from the rotational power input shaft of the fluid torque converter 16 which is connected to the rotational power output member 16b thereof; and thereby the gear transmission mechanism 18 receives rotational power from the internal combustion engine 10, with a certain degree of slippage and also torque amplification being provided for said rotational powr by the fluid torque converter 16 (unless a lock up clutch thereof, if provided thereto, is activated; such arrangements are not particularly shown) as is per se conventional. This gear transmission mechanism 18 may for the purposes of this specification be of a per se known type incorporating various planetary gear mechanisms and friction engaging mechanisms such as clutches and brakes, and, according to selective actuation of said friction engaging mechanisms provided in a per se known manner by an electrically controlled electric/hydraulic control mechanism 40 of a per se known sort including various speed change valves and/or solenoids and so on, provides any one of a plurality of speed reduction stages (including several forward speed stages and at least one reverse spped stage) between its said power input shaft and its power output shaft, its said power output shaft driving the four wheel drive power transfer device 14.

This four wheel drive power transfer device 14 incorporates a center differential device 42 of a planetary gear wheel type for providing full time differential action between the front wheels of the vehicle and the rear wheels of the vehicle during the full time four wheel drive operation thereof. Now the detailed construction of this center differential device 42 will be explained. It comprises a differential casing 46 integrally with which a power input gear wheel or crown wheel 44 is formed, said casing 46 and said crown wheel 44 being together rotatable about a certain main rotational axis. To this casing 46 there are rotatably mounted two differential gear pinions 50, each being rotatably fitted on one of two coaxially opposed and spaced shafts 48 which are fitted to the differential casing 46 so as to lie parallel to the crown wheel 44 at a certain perpendicular distance away therefrom, both said shafts 48 extending perpendicularly to said main rotational axis of the differential casing 46. The casing 46 functions as an input member for this center differential device 42, and the crown wheel 44 integrally formed with said casing 46 is constantly geared to a power output gear wheel 38 which is fixedly mounted to the end of the rotational power output shaft of the gear transmission mechanism 18. Two output side gear wheels 52 and 54 are provided, each functioning as one power input member for the center differential device 42; each of these output side gear wheels 52 and 54 is meshed with both of the two differential gear pinions 50 and is driven by them, with differential action (unless impeded) occurring between said output side gear wheels 52 and 54 in a per se conventional manner. The output side gear wheel 52 functions as one power output member for supplying power to the rear wheels (not particularly shown) of the vehicle, and said output side gear wheel 52 is rotationally connected to a gear wheel power output gear 56 which is meshed with a driven gear wheel 60 mounted on the end of a rear wheel power output shaft 58 which extends out of the four wheel drive power transfer device 14 in the downwards direction as seen in FIG. 1, i.e. towards the rear of the vehicle in this particular exemplary implementation. The lower end in the figure of this rear wheel power output shaft 58, typically via a propeller shaft (now shown either) and via a differential device or the like (also not shown), drives the rear wheels of the vehicle. And the output side gear wheel 54 functions as another power output member for the center differential device 42 for supplying power to the front wheels of the vehicle, and is rotationally connected to one end of a sleeve shaped intermediate front wheel drive shaft 62. This intermediate front wheel drive shaft 62 is formed as a tubular hollow member, and its other end is connected to the differential casing 84 of another differential device 82 for the front wheels of the vehicle.

Thus, the power distribution ratio (drive torque distribution between the intermediate front wheel drive shaft 62 for driving the front wheels of the vehicle and the output side gear wheel 52 for driving the rear wheels of the vehicle, when this four wheel drive power transfer device 14 is operating freely (i.e. when a clutch 64 to be described shortly is in the fully released condition), is 1:1; i.e., this four wheel drive power transfer device 14 is of the type which distributes substantially the same amount of torque to the rear vehicle wheels and to the front vehicle wheels.

Now the detailed construction of this front wheels differential device 82 will be explained. It comprises the differential casing 84 integrally connected to the intermediate front wheel drive shaft 62, and to this casing 84 there are rotatably mounted two differential gear pinions 88, each being rotatably fitted on one of two coaxially opposed and spaced shafts 86 which are fitted to the differential casing 84 so as to extend perpendicularly to the main rotational axis of said differential casing 84. Two output side gear wheels 90 and 92 are provided, each functioning as one power output member for this front wheels differential device 82; each of these output side gear wheels 90 and 92 is meshed with both of the two differential gear pinions 88 and is driven by them, with differential action (unless impeded) occurring between said output side gear wheels 90 and 92 in a per se conventional manner. The left side power ouput gear wheel 92 functions as one power output member for supplying power to the left front wheel (not particularly shown) of the vehicle, and said left side power output gear wheel 92 is rotationally connected to a left front wheel power output shaft 96 which is connected, via a universal joint or the like also not shown, to said left front wheel of the vehicle. And the right side power output gear wheel 90 functions as another power output member for supplying power to the right front wheel (also not particularly shown) of the vehicle, and said right side power output gear wheel 90 is rotationally connected to a relatively long right front wheel power output shaft 94, which extends to the right through the central hole of the intermediate front wheel drive shaft 62 and completely through the center differential device 42, and the right end of which is connected via another universal joint or the like also not shown, to said right front wheel of the vehicle.

Within the four wheel drive power transfer device 14 there is provided a hydraulically operated wet type clutch 64, which selectively rotationally connects together the intermediate front wheel drive shaft 62 and the casing 46 of the other differential device 42, either completely or partially, or alternatively allows said members to rotate freely with respect to one another. This wet clutch 64, the construction and the actuation of which will be explained in some detail shortly, is selectively operated to a greater or lesser engagement extent (this expression relates to the maximum torque transmission capability of said wet clutch 64) by supply of actuating hydraulic fluid pressure of a greater or lesser pressure value from an electrically actuated electric/hydraulic control device 74, a partial exemplary construction for which will be outlined hereinafter. Accordingly, the four wheel drive power transfer device 14, which receives rotational power input from the gear transmission mechanism 18 and outputs said rotational power to the rear wheel power output shaft 58 and to the intermediate front wheel drive shaft 62, can be caused either to provide (in the case that the wet clutch 64 is fully disengaged) substantially free differential action for distributing said rotational power between said rear wheel power output shaft 58 and said intermediate front wheel drive shaft 62, or not to provide (in the case that the wet clutch 64 is fully engaged) any such differential action at all and just to drive said rear wheel power output shaft 58 and said intermediate front wheel drive shaft 62 independently, or to provide (in the case that the wet clutch 64 is partially but not fully engaged) a condition intermediate between these two extreme conditions, so as to partly allow the center differential device 42 to provide its differential action for distributing said rotational power between said rear wheel power output shaft 58 and said intermediate front wheel drive shaft 62 to some extent, while being somewhat impeded by the dragging action of the clutch 64, up to a certain maximum dragging action amount, which is determined by the maximum torque transmission capacity of said wet clutch 64 in the particular operational circumstances.

OPERATION OF THIS POWER TRAIN

This vehicle power train operates as follows. When the clutch 64 of the four wheel drive power transfer device 14 is operated by the electrically actuated electric/hydraulic control device 74 so as not at all to rotationally connect together the rear wheel power output shaft 58 and the intermediate front wheel drive shaft 62, so that said clutch 64 is fully disengaged, then the center differential device 42 functions so as to provide its differential effect between the rear wheel power output shaft 58 and the intermediate front wheel drive shaft 62 in full measure, i.e. so as to receive rotational power provided by the engine 10 of the vehicle and transmitted to said four wheel drive power transfer device 14 via the automatic speed change device 12, and so as to distribute said rotational power, while providing a non damped differential effect, between the rear wheels of the vehicle taken as a combination and the front wheels of the vehicle taken as a combination. On the other hand, when the clutch 64 of the four wheel drive power transfer device 14 is operated by the electrically actuated electric/hydraulic control device 74 so as to completely rotationally connect together the casing 46 and the intermediate front wheel drive shaft 62, i.e. so as to be fully engaged and so as to provide an effectively unlimited degree of torque transmission, then the center differential device 42 functions so as to provide no such differential effect at all between the rear wheel power output shaft 58 and the intermediate front wheel drive shaft 62, i.e. so as to distribute the rotational power provided from the engine 10 via the automatic speed change device 12 directly to the rear wheels of the vehicle taken as a combination and also to the front wheels of the vehicle taken as a combination in an even fashion without any provision of any differential effect at all. And, in the intermediate case between these two extremes, when said clutch 64 of said four wheel drive power transfer device 14 is operated by said electrically actuated electric/hydraulic control device 74 so as somewhat to rotationally connect together said casing 46 and said intermediate front wheel drive shaft 62, i.e. so as to be partially but not fully engaged and so as to provide a certain relatively limited degree of dragging or torque transmitting effect between these members, then said center differential device 42 functions so as to provide its differential effect between said rear wheel power output shaft 58 and said intermediate front wheel drive shaft 62 to a relatively limited or partial degree, i.e. so as to receive rotational power provided by said engine 10 of said vehicle and transmitted to said four wheel drive power transfer device 14 via said automatic speed change device 12, and so as to distribute said rotational power, while providing a partially damped differential effect, between said rear wheels of said vehicle taken as a combination and said front wheels of said vehicle taken as a combination.

THE CENTRAL DIFFERENTIAL CONTROL CLUTCH 64 AND ITS ACTUATING SYSTEM

Figure 2:
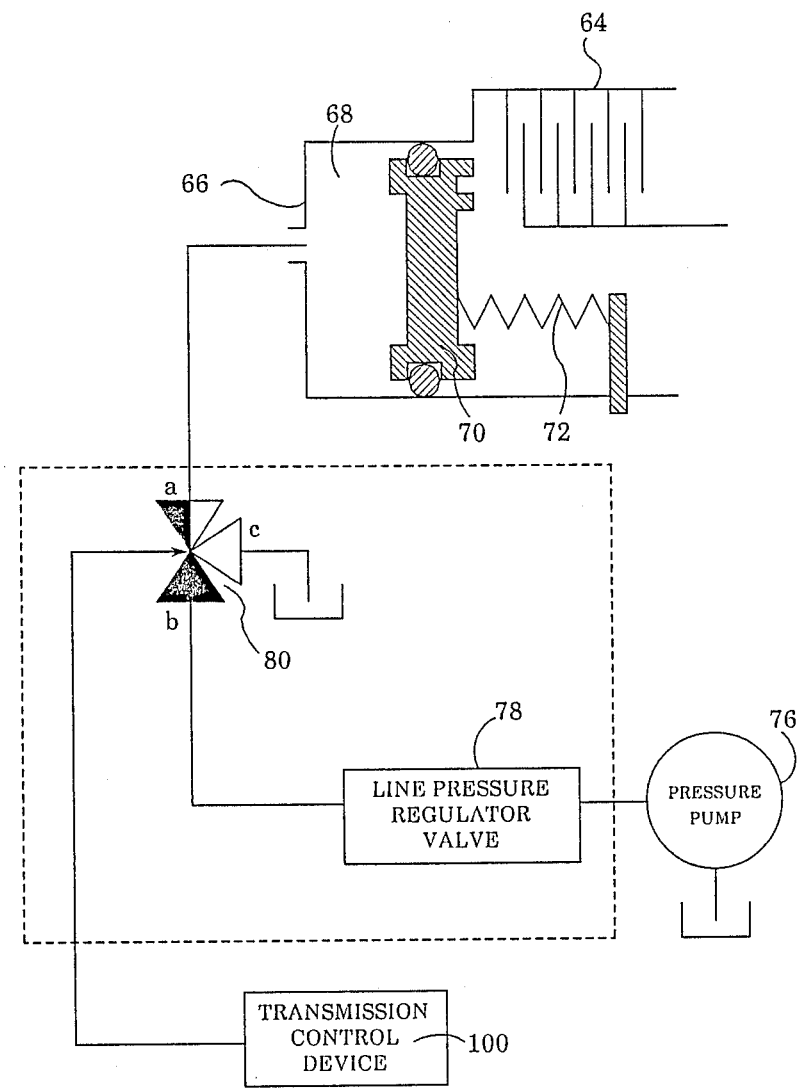
FIG. 2 is a schematic longitudinal part sectional view of a torque transfer clutch which is provided to said center differential device of the FIG. 1 power train, and of an actuating servo device therefor, and includes a partial schematic block diagrammatical view of a device for supplying hydraulic fluid pressure to said actuating servo device for actuating said torque transfer clutch, for showing details of their constructions, said torque transfer clutch and said actuating servo device therefor being incorporated in said vehicle four wheel drive front/rear coupling device and being controlled by said preferred embodiment of the control device therefor of the present invention, according to the preferred method embodiment.

In FIG. 2, there are shown a schematic longitudinal part cross sectional view of the central differential control clutch 64 of the four wheel drive power transfer device 14, and of a servo device 66 therefor, and also shows a partial schematic block diagrammatical view of a system for supplying actuating hydraulic fluid pressure to said servo device 66 for controlling said clutch 64, as incorporated in the shown central differential operation restriction device or front/rear coupling device, to which the preferred embodiment of the control device therefor of the present invention is applied; however, this particular arrangement should not be taken as unduly limitative of the present invention, as other possibilities for these structures could also be implemented, in alternative constructions. In this figure, the central differential control clutch 64 is shown as being a hydraulic servo type wet clutch, comprising two sets of mutually interleaved and sandwiched together clutch plates, one of said clutch plates sets being rotationally fixed with respect to the casing 46 of the center differential device 42, while the other said set of clutch plates are rotationally fixed with respect to the intermediate front wheel drive shaft 62 of said center differential device 42. Thus, when these two sets of clutch plates are squeezed together by the servo device 66 as will be explained in detail shortly, a maximum torque transmission capability between the casing 46 and the intermediate front wheel drive shaft 62 of the center differential device 42 is provided in a degree corresponding to the degree of squeezing together of said two sets of clutch plates, i.e. in a degree corresponding to the total force acting to squeeze the sandwich of said sets of clutch plates together.

The servo device 66 provided for thus pressing and squeezing together said sets of clutch plates comprises a pressure chamber 68 and a servo piston 70, all of these members and chambers being annular although only a partial sectional view thereof is shown in the figure. The servo piston 70 confronts the two sandwiched together sets of clutch plates, for opposing said clutch plate sets and for pressing them together, when said servo piston 70 is biased in the direction towrads said clutch plate sets (rightwards in FIG. 2). And, when the pressure chamber 68 is pressurized with hydraulic fluid, it presses the servo piston 70 against the clutch plate sets 66 and 68 in this way, and squeezes them together. A spring 72, which in fact is an annular spring and which bears against a spring retainer member, is provided for biasing said servo piston 70 in the leftwards direction as seen in FIG. 2, so as to reduce the volume of the pressure chamber 68. Thereby, when no substantial hydraulic fluid pressure is supplied to said pressure chamber 68, under the biasing action of the spring 72 the servo piston 70 is biased in the leftwards direction as seen in the drawing, so as not to substantially compress the superposed sandwich of the clutch plate sets and so as thus to let said clutch plate sets be not substantially mutually engaged; and, thereby, no substantial degree of torque transmission between the casing 46 and the intermediate front wheel drive shaft 62 of the center differential device 42 is provided. On the other hand, when a substantial degree of hydraulic fluid pressure is supplied to the pressure chamber 68, the servo piston 70 is biased, against the biasing action of the spring 72 which is overcome, in the rightwards direction as seen in the drawing, so that said servo piston 70 presses against and compresses together the superposed sandwich of the clutch plate sets with a force determined according to the magnitude of the pressure value supplied to said pressure chamber 68, thereby causing said clutch plate sets to be mutually engaged together with a maximum torque transmission capability which is determined according to said magnitude of said pressure value supplied to said pressure chamber 68; and, thereby, a maximum torque transmission capability is provided between the casing 46 and the intermediate front wheel drive shaft 62 of the center differential device 42, similarly with a maximum torque transmission magnitude determined according to the magnitude of the pressure value supplied to the pressure chamber 68.

The electrically actuated electric/hydraulic control device 74, to define its action in a functional sense, supplies a hydraulic fluid pressure of any desired pressure level from substantially zero up to line pressure to the pressure chamber 68 of this servo device 66, according to the value of an electrical control signal supplied to it; this electric signal may be a pulse signal, and the duty ratio of said pulse signal may control the pressure supplied said pressure chamber 68 of the servo device 66, for example. Thus, by varying the pressure value represented by said electrical signal, it is possible to vary the degree of torque transmission between the casing 46 and the intermediate front wheel drive shaft 62 of the center differential device 42 between substantially zero and a substantially maximum value. In the suggested exemplary construction shown in FIG. 2, the electrically actuated electric/hydraulic control device 74 comprises an electromagnetically actuated hydraulic switching valve 80, which receives supply at its port designated in the figure as "b" of hydraulic fluid pressurized by a pressure pump 76 (incorporated in the automatic transmission 12) and pressure regulated by a pressure regulator valve 78, whose port designated in the figure as "a" is connected to the pressure chamber 68 of the servo device 66 for supplying pressurized hydraulic fluid to said pressure chamber 68, and whose port designated in the figure as "c" is connected to a hydraulic fluid drain. This electromagnetically actuated hydraulic switching valve 80 is so constituted that, when actuating electrical energy is supplied to a solenoid or the like incorporated therein, it communicates its port "a" to its port "b" while not communicating its port "c" to any other port; while, on the other hand, when no such actuating electrical energy is supplied to said solenoid or the like of said electromagnetically actuated hydraulic switching valve 80, said electromagnetically actuated hydraulic switching valve 80 communicates its port "a" to its port "c" while not communicating its port "b" to any other port. Thereby, by this electromagnetically actuated hydraulic switching valve 80 being supplied with a pulse type controlling electric signal, said electromagnetically actuated hydraulic switching valve 80 supplies a pressure value to the pressure chamber 68 of the servo device 66 which is determined according to the duty ratio of said pulse electrical signal, and which can be thereby varied to any value between substantially zero and the maximum pressure value which can be delivered by the pressure regulator valve 78. This controlling pulse electrical signal is supplied from a transmission control device 100, now to be explained.

The Transmission Control System

Referring to FIG. 1, it will be seen that the following detectors and sensors are provided to this system. A throttle position sensor 102 detects a value representative of the current load on the internal combustion engine 10 by measuring the opening angle of the throttle valve (not particularly shown) of a carburetor (not shown either) of said engine 10, or by some similar means, and outputs on electrical signal representative thereof. A set range sensor 104 detects the set position of a manual range setting valve which is provided for the transmission mechanism 12, or of a setting means therefor, and outputs an electrical signal representative thereof; this manual range setting valve is not particularly shown in the figures, but said setting means therefor is provided in the passenger compartment of the vehicle so as to be readily accessible to the driver of the vehicle, and can be set to any one of a number of set positions corresponding to various operational ranges for the transmission mechanism 12 such as "D" range, "12" range, "L" range, "R" range, "N" range, and "P" range. A front wheels rotational speed sensor 106 detects a value representative of the rotational speed of the front vehicle wheels (not particularly shown) by measuring the rotational speed of a member rotationally coupled to the intermediate front wheel drive shaft 62 which drives said front vehicle wheels, or the like, and outputs an electrical signal representative thereof. A rear wheels rotational speed sensor 108 detects a value representative of the rotational speed of the rear vehicle wheels (also not particularly shown) by measuring the rotational speed of a member rotationally coupled to the rear wheel power output shaft 58 which drives said rear vehicle wheels, or the like, and outputs an electrical signal representative thereof. A steering angle sensor 110 detects a value representative of the angle of the steering system of the vehicle, and outputs an electrical signal representative thereof. And a brake switch 112 outputs an electrical signal representative of whether or not the braking system of the vehicle is being applied; this brake switch may, for example, serendipitously be the switch which is also used for operating the brake lights positioned at the rear of the vehicle. The output signals of these six sensors and switches 102 through 112 are fed to a transmission control device 100.

This transmission control device 100 outputs control signals for controlling the electric/hydraulic control device 74 for the four wheel drive power transfer device 14 and for controlling the electrical/hydraulic control mechanism 40 for the gear transmission mechanism 18, according to principles which incorporate the concept of the preferred embodiments of the vehicle four wheel drive front/rear coupling device control device and method of the present invention, as will be explained hereinafter. No concrete illustration of the structure of any particular realization of the transmission control device 100 will be given herein, since various possibilities for the details thereof can be easily supplemented by one of ordinary skill in the electronic and computer programming art based upon the functional disclosures set out in this specification. In the preferred embodiments of the device and the method of the present invention, the transmission control device 100 is concretely realized as a micro computer and its associated circuitry, said micro computer operating at the behest of a control program which will not be completely detailed herein, since the details thereof which are not disclosed in this specification can likewise be easily supplemented by one of ordinary skill in the electronic and computer programming art based upon the functional disclosures set out herein. However, it should be particularly understood that such realizations in the micro computer form, although preferred, are not the only ways in which the transmission control device 100 can be provided; in other possible embodiments it could be constituted as an electrical device not incorporating a microprocessor. In the preferred case, however, such a microprocessor will typically comprise: a CPU (central processing unit) which obeys said control program to be described shortly and which inputs data, performs calculations, and outputs data; a ROM (read only memory) which stores said program to be described shortly and initialization data therefor and so on; and a RAM (random access memory) which stores the results of certain intermediate calculations and data and so on; and these devices together will constitute a logical calculation circuit, being joined together by a common bus which also links them to an input port and an output port which together perform input and output for the system. And the system will typically also include buffers for the electrical signals outputted from the various sensors and/or switches 102 through 112 to the input port device, and drive circuits through which actuating electrical signals are passed from the output port device to a speed change control solenoid or solenoids of the electrical/hydraulic control mechanism 40 for controlling the automatic speed change device 12 and to the solenoid or the like of the electromagnetically actuated hydraulic switching valve 80 of the electric/hydraulic control device 74 for controlling the torque transmission capacity of the clutch 64 of the four wheel drive power transfer device 14 by supplying appropriate hydraulic fluid pressure to the pressure chamber 68 of the servo mechanism 66. It should be understood that the transmission control device 100 generally functions so as to engage an appropriate one of the various speed stages of the gear transmission mechanism 18 of the transmission mechanism 12 according to the current values of various vehicle operating parameters such as the vehicle road speed as sensed by one or another or a combination of the front and rear wheels rotational speed sensors 106 and 108, the engine load (throttle opening) as sensed by the throttle position sensor 102, and the operating range of the transmission as manually set by the vehicle driver on the setting means therefor as sensed by the set range sensor 104; such a transmission shift stage selection function may be performed in a per se conventional way, and no particular details thereof will be shown or suggested in this specification, since various possibilities for the details thereof can be easily supplemented as appropriate by one of ordinary skill in the transmission control and the programming arts, particularly when based upon the functional disclosures set out in this specification. Further, said transmission control device 100 generally functions as will now be explained, so as to control the torque transmission capacity of the clutch 64 of the center differential device 42 of the four wheel drive power transfer device 14, according to the difference between the rotational speed of the front wheels of the vehicle as detected by the sensor 106 therefor and the rotational speed of the rear wheels of the vehicle as detected by the sensor 108 therefor, as well as other operational parameters.

THE CONTROL ACCORDING TO THE PREFERRED METHOD EMBODIMENT

Figure 3:
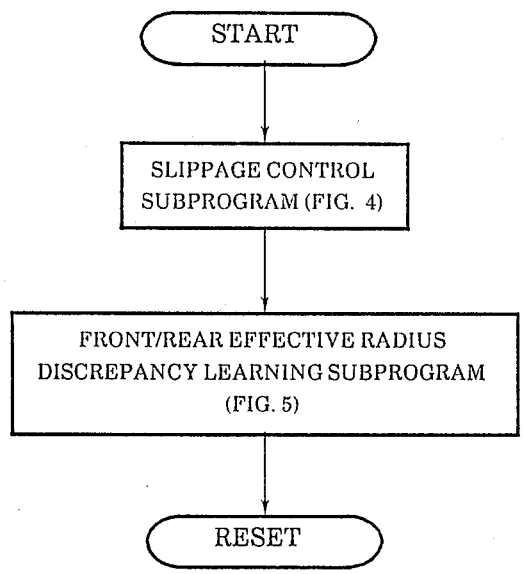
FIG. 3 is a first portion of a fragmentary flow chart for showing the overall operation of this preferred method embodiment, illustrating the flow of a top level program portion which is obeyed by a transmission control device which is shown by a block in FIGS. 1 and 2 and is included in this preferred device embodiment.
Figure 4:
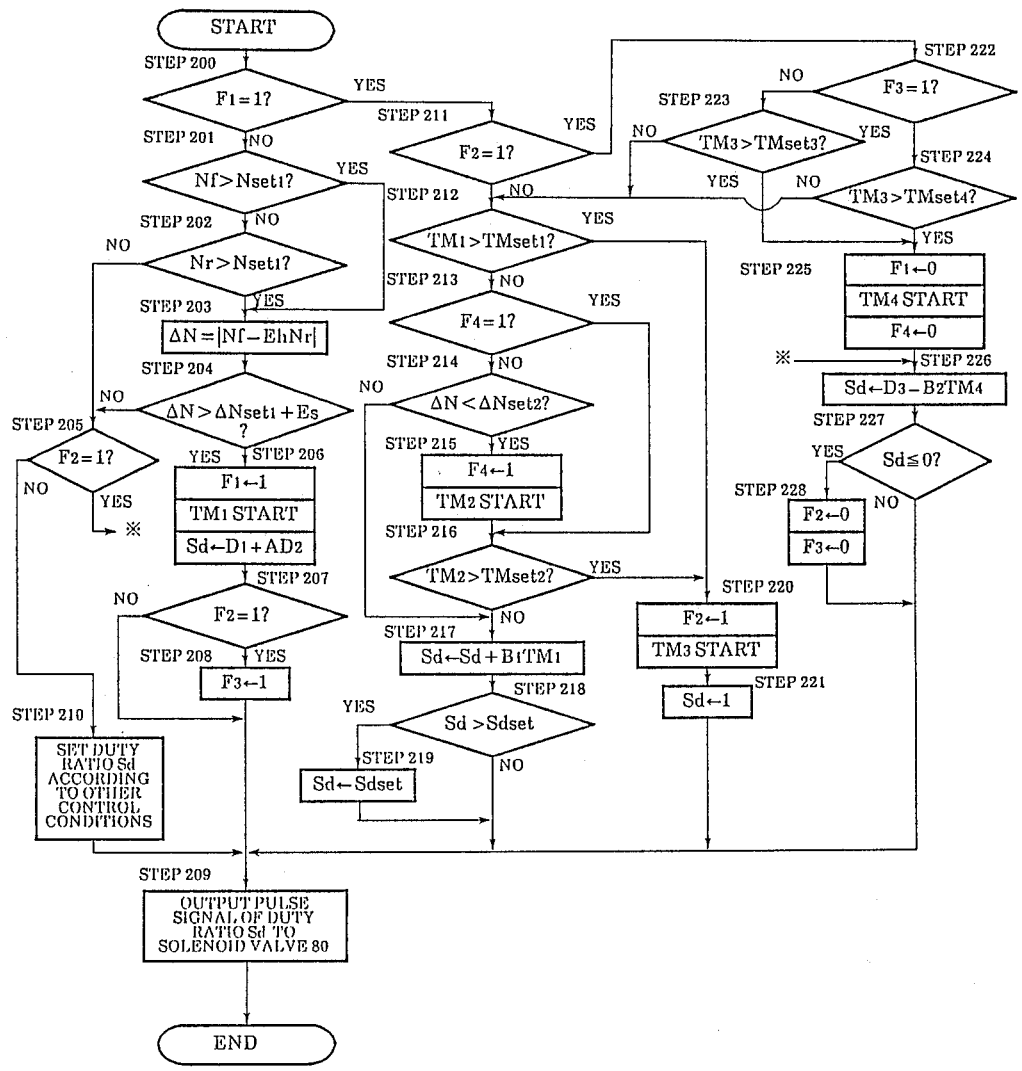
FIG. 4 is a portion of said fragmentary flow chart for showing the operation of this preferred method embodiment, particularly showing the operation of a slippage control subprogram thereof which is invoked from the FIG. 3 flow chart.
Figure 5:
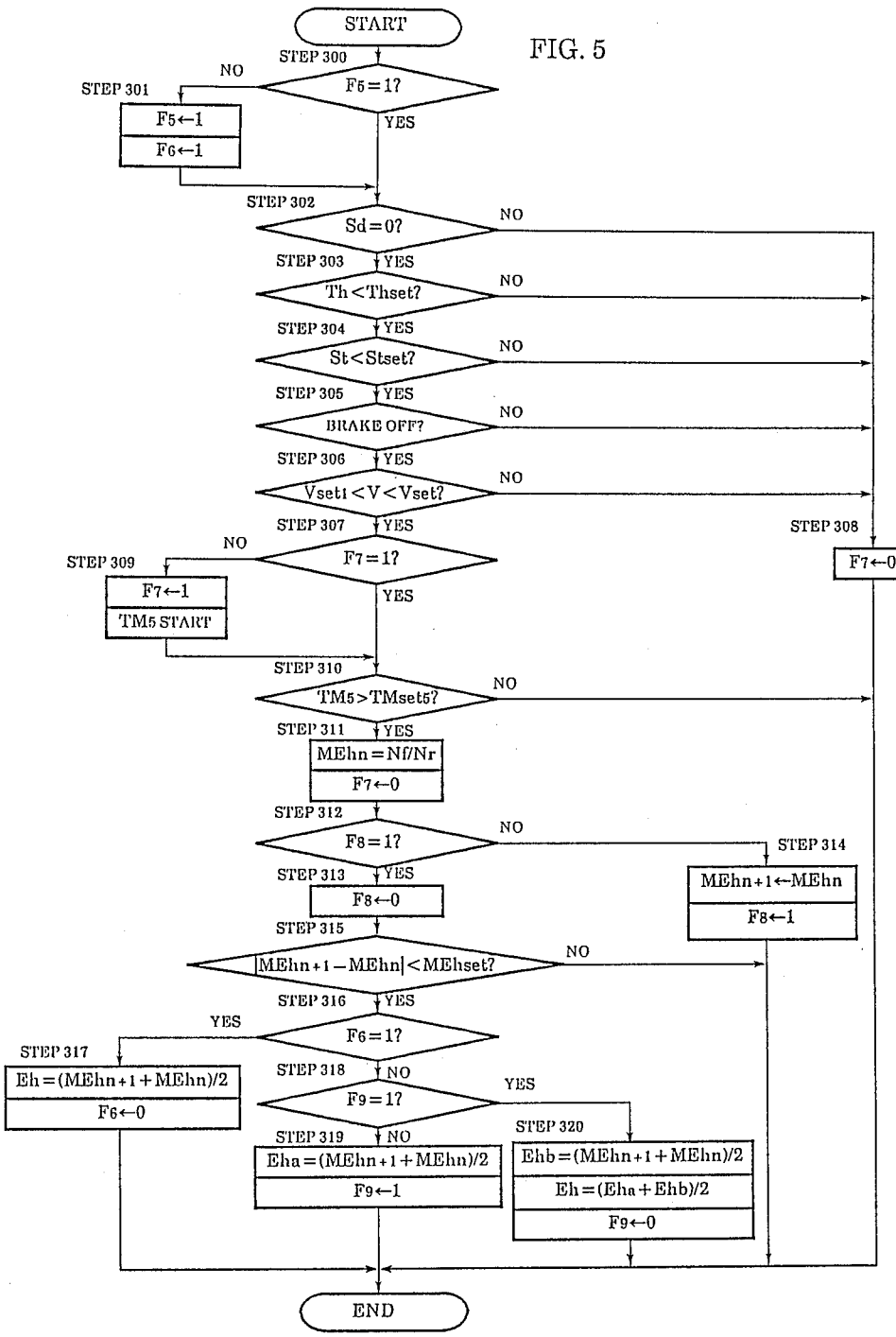
FIG. 5 is a portion of said fragmentary flow chart for showing the operation of this preferred method embodiment, particularly showing the operation of a front/rear effective radius discrepancy learning subprogram thereof which is invoked from the FIG. 3 flow chart.

FIGS. 3 through 5 show in fragmentary form first through third portions of a flow chart for explaining the operation of a portion of the aforementioned control program which directs the operation of the transmission control device 100, according to this preferred embodiment of the vehicle four wheel drive front/rear coupling device control device of the present invention, so as to realize the preferred embodiment of the vehicle four wheel drive front/rear coupling device control method of the present invention. This flow chart will now be explained; no particular programming steps for implementing said flow chart are shown or suggested in this specification, since various possibilities for the details thereof can be easily supplemented as appropriate by one or ordinary skill in the programming art, particularly when based upon the functional disclosures set out in this specification. The flow charts of FIGS. 3 through 5 only relate to the portion of the control program of the transmission control device 100 which controls the supply of actuating hydraulic fluid pressure to the clutch 64 of the center differential device 42 of the four wheel drive power transfer device 14, i.e. which serve for controlling the electrically actuated electric/hydraulic control device 74, and further only show this process in schematic form; said flow charts of FIGS. 3 through 5 therefore do not show any portion of said control program relating to the control provided for the gear transmission mechanism 18 of the automatic transmission mechanism 12. These fragments will be sufficient for exemplifying the principles of the present invention.

First to explain the FIG. 3 flow chart, this shows the overall flow of the control system program for the clutch 64, this program portion is executed at regular intervals of for example a few milliseconds, of course after the engine 10 is started as the vehicle incorporating it is driven. First, in the first block after the START block, the slippage control subprogram whose flow chart is shown in FIG. 4 is performed. Next, the front-/rear effective radius discrepancy learning subprogram whose flow chart is shown in FIG. 5 is performed. And next, via the END block, the flow of control returns to cycle around again. The net effort of this program, therefore, is that the slippage control subprogram and the front/rear effective radius discrepancy learning subprogram are repeatedly and alternatively performed at a fairly high frequency.

Next, the slippage control subprogram whose flow chart is shown in FIG. 4 will be explained.

In the flow chart in FIG. 4 which generally comprises three columns of flow of steps, the first column of flow of steps operates to increase the duty ratio of the pulse type control current supplied to the elctromagnetically actuated hydraulic switching valve 30 steppedly from zero to a certain value when the difference between the rotational speed of the front wheels and the rotational speed of the rear wheels exceeds a certain critical value; the second column of flow of steps operates to gradually increase the duty ratio with time for a predetermined period so that the duty ratio is finally set to a predetermined high value with the lapse of the predetermined period; and the third column of flow of steps operates to decrease the duty ratio down to zero. The shifting between these generally three columns of flow of steps is controlled by the combination of flags and timers as described in detail hereinunder.

First, after the START block, in the decision step 200, the transmission control device 100 makes a decision as to whether or not the value of a flag F1 is unity. This flag F1 is used for indicating that, during slippage of at least one of the vehicle wheels, the clutch 64 is at least partially currently engaged, i.e. that torque transmission capacity increase control of said clutch 64 is being performed. If the result of this decision is YES, so that indeed F1 is equal to unity and the clutch 64 is currently at least partially engaged, then the flow of control passes next to the decision step 211; but, if the result of this decision is NO, so that F1 is not equal to unity and accordingly the clutch 64 is currently fully disengaged, then the flow of control passes next to the decision step 201.

In the next decision step 201, the transmission control device 100 makes a decision as to whether or not the value Nf of the rotational speed of the front vehicle wheels, as measured by the output of the front wheels rotational speed sensor 106, is greater than a certain determinate value Nset1 which is an extremely small fixed value. If the result of this decision is YES, so that indeed Nf is greater than Nset1, then the flow of control skips to pass next to the step 203; but, if the result of this decision is NO, so that in fact Nf is not greater than this very low value Nset1, then the flow of control passes next to the decision step 202.

In this next decision step 202, the transmission control device 100 makes a decision as to whether or not the value Nr of the rotational speed of the rear vehicle wheels, as likewise measured by the output of the rear wheels rotational speed sensor 108, is greater than this certain extremely small fixed value Nset1. If the result of this decision is YES, so that indeed Nr is greater than Nset1, then the flow of control passes next to the step 203; but, if the result of this decision is NO, so that in fact Nr is not greater than this very low value Nset1, then the flow of control passes next to the decision step 205.

In the step 203, which thus is reached if either the rotational speed Nf of the front vehicle wheels or the rotational speed Nr of the rear vehicle wheels is greater than this extremely small threshold value Nset1, the transmission control device 100 calculates the value delta-N, which is the effective front/rear rotational speed difference, as being the absolute value of the difference between the rotationalspeed Nf of the front vehicle wheels and the learnt correction coefficient Eh times the rotational speed Nr of the rear vehicle wheels, and then the flow of control passes next to the decision step 204. Now, this value Eh is a correction value for allowing for the different rolling radiuses in practice of the front vehicle wheels (taken as a combination) and the rear vehicle wheels (taken as a combination), and the value of said learnt correction coefficient Eh (which is near but typically not exactly unity) is determined by a learning process as will be explained hereinafter with reference to the FIG. 5 flow chart.

In the next decision step 204, the transmission control device 100 makes a decision as to whether or not the value of this effective front/rear rotational speed difference delta-N is greater than a constant value delta-Nset1 (which may be a relatively small constant value such as for example 50 rpm) plus a correction amount Es determined according to the current value of the steering angle of the vehicle, as determined from the current value of the output signal of the steering angle sensor 110. Thus, this test determines whether or not at least one of the vehicle wheels is skidding on the surface of the road. If the result of this decision is YES, so that indeed at least one of the vehicle wheels is currently skidding on the road surface, then the flow of control passes next to the step 206; but, if the result of this decision is NO, so that in fact none of the vehicle wheels is currently skidding on the road surface, then the flow of control passes next to the decision step 205.

In this decision step 205, which thus is reached if either the vehicle road speed is very low or currently of the vehicle wheels is skidding on the road surface, the transmission control device 100 makes a decision as to whether or not the value of a flag F2 is unity. This flag F2 is used for indicating whether or not torque transmission capacity increase control of the clutch 64 has been completed. If the result of this decision is YES, so that the value of the flag F2 is indeed unity, then the flow of control passes via the crossed sign to the step 226 of this flow chart; but, if the result of this decision is NO, so that the value of the flag F2 is not in fact unity, then the flow of control passes next to the step 210.

On the other hand in the step 206, to which the flow of control passes when the conditions for performing torque transmission capacity increase control of the clutch 64 hold, the transmission control device 100 sets the value of the flag F1 to unity, starts a first timer TM1 running, and sets the duty ratio Sd of the pulse signal which is to be supplied to the solenoid of the electromagnetically actuated hydraulic switching valve 80 (see FIG. 2) to the value D1+AD2. Here D1 is a fixed constant value, while AD2 is a throttle opening proportionality correction value, which is arranged to be the larger when the throttle opening (engine load) of the engine 10 is the larger; this engine throttle opening is determined according to the current value of the output signal of the throttle position sensor 102. After this step 206, then the flow of control passes next to the decision step 207.

In this next decision step 207, the transmission control device 100 makes a decision as to whether or not the current value of the flag F2 is unity. If the result of this decision is NO, so that in fact the current value of the flag F2 is not unity, then the flow of control skips to pass next to the decision step 209; but, if the result of this decision is NO, so that indeed the current value of the flag F2 is unity, then the flow of control passes next to the step 208.

In this step 208, the transmission control device 100 sets the value of a flag F3 to unity, and then the flow of control passes next to the step 209. This flag F3 is used for indicating whether or not, in the torque transmission capacity increase control release stage one iteration of this FIG. 4 subprogram before, the torque transmission capacity increase control conditions held (holding of these conditions is indicated by a unity value for the flag F3).

In the next step 209, to which the flow of control also passes from other program points as will be explained later, the transmission control device 100 actually outputs the pulse signal whose duty ratio Sd has been determined as explained above to the solenoid of the electromagnetically actuated hydraulic switching valve 80, and then the flow of control passes next to the END point of this FIG. 4 flow chart fragment, and the action of this subprogram for the transmission control device 100 terminates without doing anything further.

On the other hand, in the step 210 to which control passes on the NO branch from the decision step 205, the transmission control device 100 sets the duty ratio Sd for the pulse signal which is to be supplied to the solenoid of the electromagnetically actuated hydraulic switching valve 80 according to other control conditions, and then the flow of control passes next to the step 209, just explained above.

Referring now to the decision step 211, which, since it is located on the YES branch from the decision step 200, is performed after beginning the torque transmission capacity increase control of the clutch 64, in this decision step the transmission control device 100 makes a decision as to whether or not the current value of the flag F2 is unity. If the result of this decision is YES, so that indeed currently the value of the flag F2 is unity, then the flow of control passes next to the decision step 222; but, if the result of this decision is NO, so that in fact the value of the flag F2 is not currently unity, then the flow of control passes next to the decision step 212.

In this next decision step 212, to which also the flow of control comes from the NO branches from the decision steps 223 and 224, the transmission control device 100 makes a decision as to whether or not the time period currently timed by the first timer is greater than a determinate time period TMset1. This determinate time period TMset1 may be a relatively long time period or for example 50 seconds. If the result of this decision is YES, so that this determinate time period TMset1 has now elapsed since the first timer was started (in the step 206), then the flow of control passes next to the step 220; but, if the result of this decision is NO, so that in fact this determinate time period TMset1 has not yet elapsed since the first timer was started, then the flow of control passes next to the decision step 213.

In this next decision step 213, the transmission control device 100 makes a decision as to whether or not the current value of a flag F4 is unity. This flag F4 is used for indicating whether or not torque transmission capacity increase control completion is allowed. If the result of this decision is YES, so that indeed the current value of the flag F4 is unity, then the flow of control passes next to the decision step 216; but, if the result of this decision is NO, so that in fact the current value of the flag F4 is not unity, then the flow of control passes next to the decision step 214.

In the next decision step 214, the transmission control device 100 makes a decision as to whether or not the value of the effective front/rear rotational speed difference delta-N, found in the same manner as in the step 203 described above, is less than a constant value delta-Nset2, which may be an extremely small constant value such as for example 10 rpm. If the result of this decision is YES, so that indeed the value of the rotational speed difference delta-N is less than delta-Nset2, then the flow of control passes next to the step 215; but, if the result of this decision is NO, so that in fact the value of the rotational speed difference delta-N is not less than delta-Nset2, then the flow of control passes next to the step 217.

In the step 215, the transmission control device 100 sets the value of the flag F4 to unity, and further starts a second timer TM2 running, and then the flow of control passes next to the decision step 216.

In this next decision step 216, to which also the flow of control comes from the YES branch from the decision step 213, the transmission control device 100 makes a decision as to whether or not the time period currently timed by the second timer is greater than a determinate time period TMset2. This determinate time period TMset2 may be a relatively short time period of for example 0.5 seconds. If the result of this decision is YES, so that this determinate time period TMset2 has now elapsed since the second timer was started (in the step 215), then the flow of control passes next to the step 220; but, if the result of this decision is NO, so that in fact this determinate time period TMset2 has not yet elapsed since the second timer was started, then the flow of control passes next to the step 217.

In this step 217, the transmission control device 100 increments the duty ratio Sd of the pulse signal which is to be supplied to the solenoid of the electromagnetically actuated hydraulic switching valve 80 by the scale factor B1 multiplied by the currently timed value of the first timer TM1, thus gradually increasing this duty ratio Sd over the passage of time; and then the flow of control passes next to the decision step 218.

In the next decision step 218, the transmission control device 100 makes a decision as to whether or not this duty ratio Sd for the pulse signal to be supplied to the solenoid of the electromagnetically actuated hydraulic switching valve 80 has exceeded a determinate limit value Sdset. If the result of this decision is YES, so that now Sd has been brought to be greater than Sdset, then the flow of control passes next to the step 219, in which Sd is set back to be equal to its limit value Sdset, and then the flow of control passes next to the step 209; but, if the result of the step 218 decision is NO, so that Sd has not become greater than its limit value Sdset, then the flow of control next directly passes to said step 209, already discussed, in which the pulse signal for the electromagnetically actuated hydraulic switching valve 80 is actually outputted.

On the other hand, in the step 220 and in the step 221 which directly follows said step 220, the transmission control device 100 sets the value of the flag F2 to unity, and further starts a third timer TM3 running, and yet further sets the value of the duty factor Sd to unity (representing 100% duty factor), and then the flow of control passes next to the previously described step 209.

Thus, the duty ratio Sd is set as shown in the FIG. 6 time chart during torque transmission capacity increase control: this duty ratio Sd increases relatively quickly by an amount D1+AD2, and thereafter increases relatively gradually by increments of B1Tm1 up to a maximum of Sdset; however, once the rotational speed difference delta-N has dropped below delta-Nset2, then after the time Tmset2 has elapsed the duty ratio Sd is increased up to its maximum possible value of 100%.

After starting this torque transmission capacity increase control, once a time Tmset1 has elapsed, the duty ratio Sd is likewise forcibly increased up to its maximum possible value of 100%.

Now, this duty ratio signal is supplied to the solenoid or the like of the electromagnetically actuated hydraulic switching valve 80, and accordingly the pressure which is supplied to the pressure chamber 68 of the servo mechanism 66 depends upon the line pressure supplied by the pressure regulator valve 78 and upon this duty ratio Sd. Accordingly, the clutch 64 of the center differential device 42 is engaged by an amount proportional to this duty ratio Sd, i.e. a maximum torque transmission capacity is provided between the casing 46 and the intermediate front wheel drive shaft 62 of the four wheel drive power transfer device 14, proportional to said duty ratio Sd, and accordingly with the same characteristics with respect to time as shown for said duty ratio Sd in FIG. 6.

On the YES branch from the decision step 211, control passes to the decision step 222, in which the transmission control device 100 makes a decision as to whether or not the current value of the flag F3 is unity. Actually, the current value of said flag F3 will be unity, if and only if during the previous torque transmission capacity increase control release stage the conditions for torque transmission capacity increase control held. If the result of this decision is YES, so that indeed the current value of the flag F3 is unity, then the flow of control passes next to the decision step 224; but, if the result of this decision is NO, so that in fact the current value of the flag F3 is not unity, then the flow of control passes next to the decision step 223.

In the decision step 223, the transmission control device 100 makes a decision as to whether or not the time period currently timed by the third timer is greater than a determinate time period TMset3. This determinate time period TMset3 may be a time period of for example 5 seconds, and is the time period elapsed from the completion of torque transmission capacity increase control. If the result of this decision is YES, so that this determinate time period TMset3 has now elapsed since the third timer was started (in the step 220), then the flow of control passes next to the step 225; but, if the result of this decision is NO, so that in fact this determinate time period TMset3 has not yet elapsed since the third timer was started, then the flow of control passes next to the decision step 212, previously described.

On the other hand, in the decision step 224, the transmission control device 100 makes a decision as to whether or not the time period currently timed by the third timer is greater than another determinate time period TMset4. This determinate time period TMset4 may be a longer time period of for example 15 seconds, and is the time period elapsed from the completion of torque transmission capacity increase control. If the result of this decision is YES, so that this determinate time period TMset4 has not elapsed since the third timer was started (in the step 220), then the flow of control passes next to the step 225; but, if the result of this decision is NO, so that in fact this determinate time period TMset4 has not yet elapsed since the third timer was started, then the flow of control passes next to the decision step 212, previously described.

Next, in the step 225, the transmission control device 100 sets the value of the flag F1 and the value of the flag F4 to zero, and further starts a fourth timer TM4 running, and then the flow of control passes next to the step 226. It should be noted that the flow of control also passes to this step 226, via the crossed sign, from the YES branch from the decision step 205, previously described.

In this step 226, the transmission control device 100 sets the duty ratio Sd of the pulse signal which is to be supplied to the solenoid of the electromagnetically actuated hydraulic switching valve 80 to the value D3-B2TM4, i.e. to a constant value D3 decremented by the scale factor B2 multiplied by the currently timed value of the fourth timer TM4, thus gradually decreasing this duty ratio Sd over the passage of time; and then the flow of control passes next to the decision step 227.

In this next decision step 227, the transmission control device 100 makes a decision as to whether or not this pulse signal duty ratio Sd for the pulse signal to be supplied to the electromagnetically actuated hydraulic switching valve 80 has been (over-) decremented below zero. If the result of this decision is YES, so that now SD has been brought to be less than its limit value zero, then the flow of control passes next to the step 228, in which the value of the flag F2 is set to zero and also the value of the flag F3 is set to zero, and then the flow of control passes next to the step 209; but, if the result of the step 227 decision is NO, so that Sd has not become less than its limit value zero, then the flow of control next directly passes to said step 209, already discussed, in which the pulse signal of duty ratio Sd for the pulse signal to be supplied to the electromagnetically actuated hydraulic switching valve 80 is actually outputted.

Thus, in completion of torque transmission capacity increase control, when the conditions for torque transmission capacity increase control the previous occasion with the released stage of torque transmission capacity increase control did not hold, then after completion of torque transmission capacity increase control, when for example 5 seconds has elapsed, Sd is reduced gradually as for example by the formula D3-B2TM4, and accordingly the maximum torque transmission capacity of the clutch 64 is gradually reduced; but, on the other hand, when on the previous occasion of releasing the torque transmission capacity increase control the conditions for torque transmission capacity increase control did hold, then after completion of torque transmission capacity increase control, once for example 15 seconds has elapsed, similarly Sd is reduced gradually as for example by the formula D3-B2TM4, and accordingly the maximum torque transmission capacity of the clutch 64 is gradually reduced. In both cases of the releasing stage of torque transmission capacity increase control, if the conditions for torque transmission capacity increase control hold, by executing the step 206 the transmission control device 100 begins increasing the duty ratio Sd again, and the reduction of the torque transmitting capacity of the clutch 64 is stopped and instead said torque transmitting capacity of the clutch 64 is increased.

Next, the front/rear effective radius discrepancy learning subprogram whose flow chart is shown in FIG. 5 will be explained.

First, after the START block, in the decision step 300, the transmission control device 100 makes a decision as to whether or not the value of a flag F5 is unity. This flag F5 is used for indicating that this is the first execution of this front/rear effective radius discrepancy learning subprogram since the ignition of the vehicle was last switched on, and a value of zero indicates that indeed this is the first such execution of this learning subprogram, whereas a value of unity indicates that this learning subprogram has already been executed at least once since the ignition of the vehicle was last switched on. If the result of this decision is YES, so that indeed F5 is equal to unity and thus this is not the first such execution of this learning subprogram, then the flow of control skips to pass next to the decision step 302; but, if the result of this decision is NO, so that in fact this is the first execution of this learning subprogram, then the flow of control passes next through the step 301, in which the value of the flag F5 is set to unity and also the value of a flag F6 is set to unity, and then the flow of control proceeds, again, to the decision step 302.

In this next decision step 302, which is the first condition test for data collection learning control, the transmission control device 100 makes a decision as to whether or not the value of the duty ratio Sd for the pulse signal to be supplied to the electromagnetically actuated hydraulic switching valve 80 is zero, i.e. as to whether or not the clutch 64 is currently in the substantially completely released condition. If the result of this decision is NO, so that in fact said duty ratio Sd is not zero and said clutch 64 is currently not completely released, then the flow of control passes next to the step 308; but, if the result of this decision is YES, so that indeed said duty ratio Sd is zero and said clutch 64 is currently substantially completely released, then the flow of control passes next to the decision step 303.

In this next decision step 303, which is the second condition test for data collection learning control, the transmission control device 100 makes a decision as to whether or not the throttle opening (engine load) Th of the engine 10, as determined from the output signal of the throttle opening sensor 102, is less than a determinate value Thset therefor; this value Thset may, for example, represent a throttle opening value of from about 7% to about 15% open. If the result of this decision is NO, so that in fact engine throttle opening Th is not less than said determinate value Thset, then as before the flow of control passes next to the step 308; but, if the result of this decision is YES, so that indeed engine throttle opening Th is less than said determinate value Thset, then the flow of control passes next to the decision step 304.

In this next decision step 304, which is the third condition test for data collection learning control, the transmission control device 100 makes a decision as to whether or not the steering angle St of the steering system of the vehicle, as determined from the output signal of the steering angle sensor 110, is less than a determinate value Stset therefor. If the result of this decision is NO, so that in fact vehicle steering angle St is not less than said determinate value Stset, then as before the flow of control passes next to the step 308; but, if the result of this decision is YES, so that indeed vehicle steering angle St is less than said determinate value Stset, then the flow of control passes next to the decision step 305.

In this next decision step 305, which is the fourth condition test for data collection learning control, the transmission control device 100 makes a decision as to whether or not the braking system of the vehicle is currently not being applied, based upon the output signal of the brake switch 112. If the result of this decision is NO, so that in fact the braking system of the vehicle is currently being applied, then as before the flow of control passes next to the step 308; but, if the result of this decision is YES, so that indeed the braking system of the vehicle is currently not being applied, then the flow of control passes next to the decision step 306.

In this next decision step 306, which is the fifth condition test for data collection learning control, the transmission control device 100 makes a decision as to whether or not the current value V of the vehicle speed is between the lower bound of Vset1 and the upper bound of Vset2; typically, for example, Vset1 may be 30 kph, while Vset2 may be 100 kph. If the result of this decision is NO, so that in fact the vehicle speed V is outside these bounds of Vset1 and Vset2, then as before the flow of control passes next to the step 308; but, if the result of this decision is YES, so that indeed the vehicle speed V is within the bounds of Vset1 and Vset2, then the flow of control passes next to the decision step 307.

In this next decision step 307, the transmission control device 100 makes a decision as to whether or not the value of a flag F7, which indicates when learning control for the front/rear effective radius discrepancy is being performed, is unity. If the result of this decision is YES, so that indeed the current value of the flag F7 is unity, then the flow of control skips to pass next directly to the decision step 310; but, if the result of this decision is NO, so that in fact the current value of the flag F7 not unity, then the flow of control passes next to the step 309, in which the transmission control device 100 sets the value of the flag F7 to be unity, and further starts a fifth timer TM5; and then as before the flow of control passes next directly to the decision step 310.

On the other hand, in the step 308, the transmission control device 100 sets the value of the flag F7 to zero, in order to indicate that learning control for the front/rear effective radius discrepancy is not being performed, and then the flow of control passes next to the END point of this FIG. 5 flow chart, and the action of this portion of the program for the transmission control device 100 terminates without doing anything further.

Now, in the decision step 310, the transmission control device 100 makes a decision as to whether or not the time period currently times by the fifth timer is greater than another determinate time period TMset5. This determinate time period TMset5 may be a time period of for example 2 minutes. If the result of this decision is YES, so that indeed this determinate time period TMset5 has now elapsed since the fith timer was started (in the step 309), then the flow of control passes next to the step 311; but, if the result of this decision is NO, so that in fact this determinate time period TMset5 has not yet elapsed since the fifth timer was started, then the flow of control passes next to the END point of this FIG. 5 flow chart, and the action of this portion of the program for the transmission control device 100 terminates without doing anything further.

In the next step 311, the transmission control device 100 calculates the value for MEhn, which is the current discrepancy between the current dynamic rolling radius of the front vehicle wheels and the current dynamic rolling radius of the rear vehicle wheels, and which value MEhn is interpreted in these preferred device and method embodiments as being the ratio between said dynamic rolling radiuses, (as per the calculation performed in the previously described step 203), as being the ratio between the current value of the rotational speed Nf of the front vehicle wheels as detected by the front wheels rotational speed sensor 106 and the current value of the rotational speed Nr of the rear vehicle wheels as detected by the rear wheels rotational speed sensor 108. Also, in this step 311, the value of the flag F7 is set to zero; and then the flow of control passes next to the decision step 312.

In the next decision step 312, the transmission control device 100 makes a decision as to whether or not the value of a flag F8 is unity. This flag F8 is used for indicating whether this front/rear effective radius discrepancy learning subprogram has been executed an even number of times since the ignition of the vehicle was last switched on, and an odd number of times. If the result of this decision is YES, so that indeed the current value of the flag F8 is unity, then the flow of control passes next to the step 313; but, if the result of this decision is NO, so that in fact the current value of the flag F8 is not unity, then the flow of control passes next to the step 314.

In the step 313, the transmission control device 100 merely sets the value of the flag F8 to zero, and then the flow of control passes next to the decision step 315.

On the other hand, in the step 314, the transmission control device 100 stores this value of MEhn as the previous occasion calculated value MEhn+1, and also sets the value of the flag F8 to unity, and then the flow of control passes next to the END point of this FIG. 5 flow chart, and the action of this portion of the program for the transmission control device 100 terminates without doing anything further.

In the next decision step 315, the transmission control device 100 makes a decision as to whether or not the absolute value of the difference between MEhn as calculated this time and the previous occasion calculated value thereof MEhn+1 is less than a determinate threshold value MEhset. If the result of this decision is NO, so that in fact the presently calculated value of MEhn is considered as being significantly different from the previous occasion calculated value thereof MEhn+1, then it is considered that the learning process for MEhn has not yet been satisfactorily completed, and thus the flow of control passes next to the END point of this FIG. 5 flow chart, and the action of this portion of the program for the transmission control device 100 terminates without doing anything further; but, on the other hand, if the result of this decision is YES, so that now the presently calculated value of MEhn is considered as not being significantly different from the previous occasion calculated value thereof MEhn+1, then it is considered that the learning process for MEhn has now been satisfactorily completed, and then the flow of control passes next to the decision step 316, which initiates the concluding stages of this learning process.

In the next decision step 316, the transmission control device 100 makes a decision as to whether or not the current value of the flag F6 is unity. As mentioned above, the value of this flag F6 shows that this is the first time for performing this learning calculation since the ignition circuit of the engine 10 of the vehicle was switched on. If the result of this decision is YES, so that indeed the current value of the flag F6 is unity and this learning calculation has only been performed once, then the flow of control passes next to the decision step 317; but, if the result of this decision is NO, so that in fact the current value of the flag F6 is not unity and this learning calculation has in fact been performed more than once, then the flow of control passes next to the decision step 318.

In the step 317, the transmission control device 100 sets the value of Eh, the learnt correction coefficient Eh which is used in the step 203 of the FIG. 4 flow chart, to be the average of the present value of MEhn and of the previous occasion calculated value thereof MEhn+1, and also the flag F6 is cleared, i.e. is set to zero; and then the flow of control passes next to the END point of this FIG. 5 flow chart, and the action of this portion of the program for the transmission control 100 terminates without doing anything further.

On the other hand, in the decision step 318, the transmission control device 100 makes a decision as to whether or not the current value of the flag F9 is unity. If the result of this decision is YES, so that indeed the current value of the flag F9 is unity, then the flow of control passes next to the step 320; but, if the result of this decision is NO, so that in fact the value of the flag F9 is not currently unity, then the flow of control passes next to the step 319.

In this step 319, the transmission control device 100 sets the value of Eha, the first learned value, to be equal to the average of the present value of MEhn and of the previous occasion calculated value thereof MEhn+1, and also the flag F9 is set to unity; and then the flow of control passes next to the END point of this FIG. 5 flow chart, and the action of this portion of the program for the transmission control device 100 terminates without doing anything further.

On the other hand, in the step 320, the transmission control device 100 calculates the value of Ehb, the second learned value, to be equal to the average of the present value of MEhn and of the previous occasion calculated value thereof MEhn+1, and then said transmission control device 100 calculates the value of Eh, the learnt correction coefficient which is used in the step 203 of the FIG. 4 flow chart, to be the average of the value of the first learned value Eha and of the value of the second learned value Ehb, this averaging technique tending to render the calculation more immune from temporary measurement errors. Also the flag F9 is cleared, i.e. is set to zero; and then the flow of control passes next to the END point of this FIG. 5 flow chart, and the action of this portion of the program for the transmission control device 100 terminates without doing anything further.

Thereby, according to such a device and such a method according to the present invention as described above, this vehicle four wheel drive front/rear coupling device control device and method, while controlling the front/rear coupling device according to the difference between the rotational speed of the rear wheels of the vehicle and the rotational speed of the front wheels of the vehicle, also by a learning process effectively take dynamic account of the difference between the effective rolling radiuses of the front vehicle wheels and of the rear vehicle wheels, by determining a parameter (the value Eh) representative of said difference between the effective rolling radiuses of the front vehicle wheels and of the rear vehicle wheels, and by subsequently applying said parameter Eh. Thereby, it is possible to set the threshold value for difference between the rotational speed of the rear wheels of the vehicle and the rotational speed of the front wheels of the vehicle (as corrected by said parameter Eh), over which the front/rear coupling device is to be engaged, much smaller than was the case in the prior art as outlined above, without running any risk of engaging the front/rear coupling device during normal vehicle operation when none of the vehicle wheels is slipping. Accordingly, as explained above, risk of unduly high tire wear is not run, and further there is no risk of unduly high fuel consumption, or of the imposition of unduly high loads upon the components of the vehicle power train; whereby the reliability and the service life of the components of the vehicle power train are not deteriorated. Further, although the above identified threshold value can be set small, this does not run any risk of not engaging the front/rear coupling device during abnormal vehicle operation when one or more of the vehicle wheels is or are slipping, and accordingly does not risk imposing unduly high loads upon said front/rear coupling device, or of deteriorating the reliability or the service life of said front/rear coupling device.

CONCLUSION

As a matter of course, the load on the internal combustion engine 10 could alternatively be determined, not by the opening of a throttle valve of a carburetor thereof as was the case in the various above disclosed preferred device and method embodiments, but according to the amount of depression of an accelerator pedal fitted in the passenger compartment of the vehicle and adapted to be depressed by the foot of the vehicle driver, or according to the amount of fuel which is injected to the cylinders of said engine 10 (in the case that fuel injection is the form of fuel provision which is equipped to said engine 10), or according to the torque supplied by said engine 10 to its power output shaft (its crank shaft), or the like. All such variations should be considered as being within the scope of the present invention.

It is acceptable, according to the principle of the present invention if the constructional details of the system are varied, although the shown ones are considered to be preferred. For example, the friction engaging device for providing torque distribution between the pair of front wheels of the vehicle and the pair of rear wheels of the vehicle could, in other embodiments, be a clutch provided in the power transmission path either to the pair of front vehicle wheels or to the pair of rear vehicle wheels and restricting or the flow of controlling the amount of torque supplied to its pair of vehicle wheels, rather than being a central differential control clutch like the clutch 64 utilized for the shown preferred embodiments. Also, even if said front/rear torque distribution providing friction engaging device were as exemplarily shown above to be a central differential control clutch, it could be provided, not between the input member and one of the output members of the central differential device as was the case with the shown preferred embodiments of the present invention, but between the two output members of said central differential device, and substantially the same effect would be provided as in the case which has been shown and described. Other modifications could also be conceived of. Therefore, although the present invention has been shown and described in terms of the preferred embodiments of the device and of the method thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. For a four wheel drive vehicle with two front wheels, two rear wheels, a four wheel drive device, and an engine, rotational power from said engine being provided via said four wheel drive device to a combination of the front wheels of said vehicle and also to a combination of the rear wheels of said vehicle, and further comprising a front/rear coupling device fitted to said four wheel drive device for selectively coupling together the rotation of said combination of said front wheels and the rotation of said combination of said rear wheels, a system for controlling said front/rear coupling device, comprising:
(a) a means for detecting the rotational speed of said combination of the front wheels of said vehicle;
(b) a means for detecting the rotational speed of said combination of the rear wheels of said vehicle;
(c) a calculating means for calculating a ratio between an effective rolling radius of the front wheels and an effective rolling radius of the rear wheels from the rotational speed of said combination of the front wheels and the rotational speed of said combination of the rear wheels as they are detected by said rotational speed detecting means when the vehicle is running along a substantially straight course at a speed within a predetermined speed range under an engine output power less than a predetermined rate with no braking while said front/rear coupling device is released; and
(d) a control means for controlling said front/rear coupling device according to a discrepancy between the detected rotational speed of said combination of the front wheels and the detected rotational speed of said combination of the rear wheels, as corrected by said calculated ratio between the effective rolling radius of the front wheels and the effective rolling radius of the rear wheels.

2. A system according to claim 1, wherein said means for calculating the ratio between the effective rolling radius of the front wheels and the effective rolling radius of the rear wheels calculates said ratio at least two times in succession until a difference between two calculated values of said ratio becomes smaller than a predetermined value, and then calculates a mean value of the two calculated values of said ratio.

3. A system according to claim 1, wherein said means for calculating said ratio between the effective rolling radius of the front wheels and the effective rolling radius of the rear wheels calculates said ratio at least two times in succession until a difference between two calculated values of said ratio becomes smaller than a predetermined value, and when said two calculated values of said ratio are smaller than said predetermined value, said calculating means calculates a first mean value of the two calculated values of said ratio, before calculating said ratio further at least two times in succession to obtain two further calculated values, and then calculates a second mean value of the two further calculated values of said ratio, said calculating means then calculating a mean value of said first mean value and said second mean value.

4. A system according to claim 1, wherein said means for controlling said front/rear coupling device controls said front/rear coupling device so as first to couple the rotation of said combination of the front wheels and the rotation of said combination of the rear wheels steppedly to a predetermined degree of coupling when said discrepancy between the detected rotaitonal speed of said combination of the front wheels and the detected rotational speed of said combination of the rear wheels as corrected by said ratio exceeds a predetermined critical value, and then to increase gradually the degree of coupling of the rotation of said combination of the front wheels and the rotation of said combination of the rear wheels with time for a predetermined time period so far that the degree of said coupling does not exceed a predetermined limit value.

5. A system according to claim 4, wherein said means for controlling said front/rear coupling device further controls said front/rear coupling device so as to release the coupling of the rotation of said combination of the front wheels and the rotation of said combination of the rear wheels first steppedly to a predetermined degree of coupling and then gradually with time toward complete release of the coupling.

* * * * *